United States Patent
Lin et al.

(10) Patent No.: US 9,058,043 B2
(45) Date of Patent: Jun. 16, 2015

(54) VOLTAGE CONVERTER FOR GENERATING OUTPUT SIGNAL WITH STEADY RIPPLE

(71) Applicant: Excelliance MOS Corporation, Hsinchu County (TW)

(72) Inventors: Pao-Chuan Lin, Hsinchu County (TW); Li-Chieh Chen, Hsinchu County (TW); Hung-Che Chou, Hsinchu County (TW)

(73) Assignee: Excelliance MOS Corporation, Hsinchu County (TW)

( * ) Notice: Subject to any disclaimer, the term of this patent is extended or adjusted under 35 U.S.C. 154(b) by 233 days.

(21) Appl. No.: 13/787,822

(22) Filed: Mar. 7, 2013

(65) Prior Publication Data

US 2014/0253060 A1 Sep. 11, 2014

(51) Int. Cl.
*G05F 1/565* (2006.01)
*G05F 1/10* (2006.01)

(52) U.S. Cl.
CPC ........................................ *G05F 1/10* (2013.01)

(58) Field of Classification Search
USPC .................................................. 323/280–289
See application file for complete search history.

(56) References Cited

U.S. PATENT DOCUMENTS

| | | | |
|---|---|---|---|
| 7,345,459 B1* | 3/2008 | Tomiyoshi et al. | 323/224 |
| 7,457,140 B2* | 11/2008 | Klein | 363/132 |
| 7,482,791 B2 | 1/2009 | Stoichita et al. | |
| 8,148,967 B2* | 4/2012 | Xing et al. | 323/288 |
| 8,198,880 B2 | 6/2012 | Ouyang | |
| 8,217,637 B2* | 7/2012 | Tsui et al. | 323/282 |
| 2007/0252567 A1* | 11/2007 | Dearn et al. | 323/282 |
| 2008/0042633 A1* | 2/2008 | Klein | 323/288 |
| 2012/0049826 A1* | 3/2012 | Hsu et al. | 323/284 |
| 2012/0074916 A1* | 3/2012 | Trochut | 323/271 |
| 2012/0112721 A1* | 5/2012 | Wu et al. | 323/288 |
| 2013/0099761 A1* | 4/2013 | Dong et al. | 323/271 |
| 2013/0106385 A1* | 5/2013 | Smith et al. | 323/288 |
| 2014/0097822 A1* | 4/2014 | Chou et al. | 323/311 |
| 2014/0225578 A1* | 8/2014 | Lin et al. | 323/271 |

* cited by examiner

*Primary Examiner* — Adolf Berhane
*Assistant Examiner* — Nusrat Quddus
(74) *Attorney, Agent, or Firm* — Jianq Chyun IP Office

(57) ABSTRACT

A voltage converter includes a constant on time signal generator, a first transistor, a second transistor, an inductor, and a ripple injection circuit. The constant on time signal generator generates a first driving signal and a second driving signal. The ripple injection circuit receives an output signal and generates a ripple injection signal. The constant on time signal generator generates the first and second driving signals according to the ripple injection signal, the output signal, and a reference signal.

12 Claims, 4 Drawing Sheets

200

DRV1

VFB

VOUT

VOLTAGE CONVERTER FOR GENERATING OUTPUT SIGNAL WITH STEADY RIPPLE

BACKGROUND OF THE INVENTION

1. Field of the Invention

The present invention relates to a voltage converter, and more particularly, to a buck voltage converter that can generate an output signal with steady ripple.

2. Description of Related Art

FIG. 1A illustrates a conventional voltage converter 100. Referring to FIG. 1A, the voltage converter 100 includes a driver 110, a logic computing circuit 120, a comparator CMP1, transistors M1, M2, an inductor L1, a capacitor C1, and resistors R1 and R2. In the voltage converter 100, the comparator CMP1 compares a reference signal REF and a feedback signal VFB to obtain a comparison result, and the logic computing circuit 120 and the driver 110 sequentially generate driving signals DRV1 and DRV2 based on the comparison result. In addition, the transistor M1 receives a power supply voltage VIN.

In the voltage converter 100, when the comparator CMP1 determines that the feedback voltage VFB is lower than the reference voltage REF, the transistor M1 turns on for a period of time according to the driving signal DRV1, causing a step down output voltage VOUT to correspondingly increase. Thereafter, the transistor M1 turns off according to the driving signal DRV1, and the transistor M2 turns on according to the driving signal DRV2, causing the step down output voltage VOUT to decrease till the feedback voltage VFB becomes lower than the reference REF again. When the feedback voltage VFB becomes lower than the reference REF again, the transistor M1 turns on again for a period of time according to the driving signal DRV1.

FIG. 1B is a waveform diagram of the voltage converter 100 of FIG. 1B. Referring to FIG. 1B, when the effective series resistance (ESR) of the capacitor C1 is too low, a ripple portion of the feedback voltage VFB becomes extremely unconspicuous, which causes an unsteady state of the ripple phenomenon on the step down output voltage VOUT, thus reducing the quality of the step down output voltage VOUT.

SUMMARY OF THE INVENTION

Accordingly, the present invention is directed to a voltage converter that can effectively generate an output signal with steady ripple.

The present invention provides a voltage converter including a constant on time signal generator, a first transistor, a second transistor, an inductor, and a ripple injection circuit. The constant on time signal generator generates a first driving signal and a second driving signal. The first transistor includes a first terminal, a second terminal, and a control terminal. The first terminal of the first transistor receives a power supply voltage. The control terminal receives the first driving signal. The second transistor includes a first terminal, a second terminal, and a control terminal. The first terminal of the second transistor is coupled to the second terminal of the first transistor. The control terminal of the second transistor receives the second driving signal. The second terminal of the second transistor is connected to a reference ground voltage. The inductor is series-connected between the second terminal of the first transistor and an output terminal of the voltage converter. An output signal is generated at the output terminal of the voltage converter. The ripple injection circuit receives the output signal and generates a ripple injection signal according to the output signal. The constant on time signal generator generates the first and second driving signals according to the ripple injection signal, the output signal, and a reference signal.

In one embodiment, the ripple injection circuit generates a ramp current according to the ripple injection signal and generates a ramp voltage according to the ramp current.

In one embodiment, the ripple injection circuit includes a transconductance amplifier and a capacitor. The transconductance amplifier has a first input terminal receiving the output signal, another input terminal receiving the reference ground voltage, and an output terminal generating the ramp current. The capacitor has a first terminal coupled to the output terminal of the transconductance amplifier and the constant on time signal generator, and a second terminal coupled to the reference ground voltage. The capacitor receives the ramp current and generates the ramp voltage at the first terminal.

In one embodiment, the ripple injection circuit further includes a reset switch coupled to the capacitor. The reset switch turns on or off in response to a control signal.

In one embodiment, the constant on time signal generator adds the output signal and the ramp voltage to generate a feedback signal. The constant on time signal generator also compares the feedback signal with the reference signal to generate the first and second driving signals.

In one embodiment, the constant on time signal generator includes an adder and a comparator. The adder adds the output signal and the ramp voltage to generate the feedback signal. The comparator receives the feedback signal and the reference signal, and the comparator compares the feedback signal with the reference signal to generate a comparison result. The constant on time signal generator generates the first and second driving signals according to the comparison result.

In one embodiment, the constant on time signal generator further include a logic computing circuit and a driver. The logic computing circuit is coupled to an output terminal of the comparator, receives the comparison result, and performs a logic computation on the comparison result. The driver is coupled to the logic computing circuit to receive a computing result of the logic computation and generate the first and second driving signals according to the computing result.

In one embodiment, the constant on time signal generator adds the output signal and the ramp current to generate a feedback signal. The constant on time signal generator compares the feedback signal with the reference signal to generate the first and second driving signals.

In one embodiment, the constant on time signal generator includes an adder and a comparator. The adder adds the reference signal and the ramp voltage to generate the feedback signal. The comparator receives the feedback signal and the output signal, and the comparator compares the feedback signal with the output signal to generate a comparison result. The constant on time signal generator generates the first and second driving signals according to the comparison result.

In one embodiment, the voltage converter further includes an output capacitor having one terminal coupled to the output terminal of the voltage converter, and another terminal coupled to the reference ground voltage. The output terminal is a low effective series resistance (ESR) capacitor.

In one embodiment, the voltage converter further includes a voltage division circuit coupled between the rippled injection circuit and the output signal.

In one embodiment, the voltage division circuit includes a first resistor and a second resistor. The first resistor has one terminal coupled to the output terminal of the voltage converter, and another terminal coupled to the ripple injection circuit. The second resistor has one terminal coupled to the first resistor and the output terminal of the voltage converter, and another terminal coupled to the reference ground voltage.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1A:
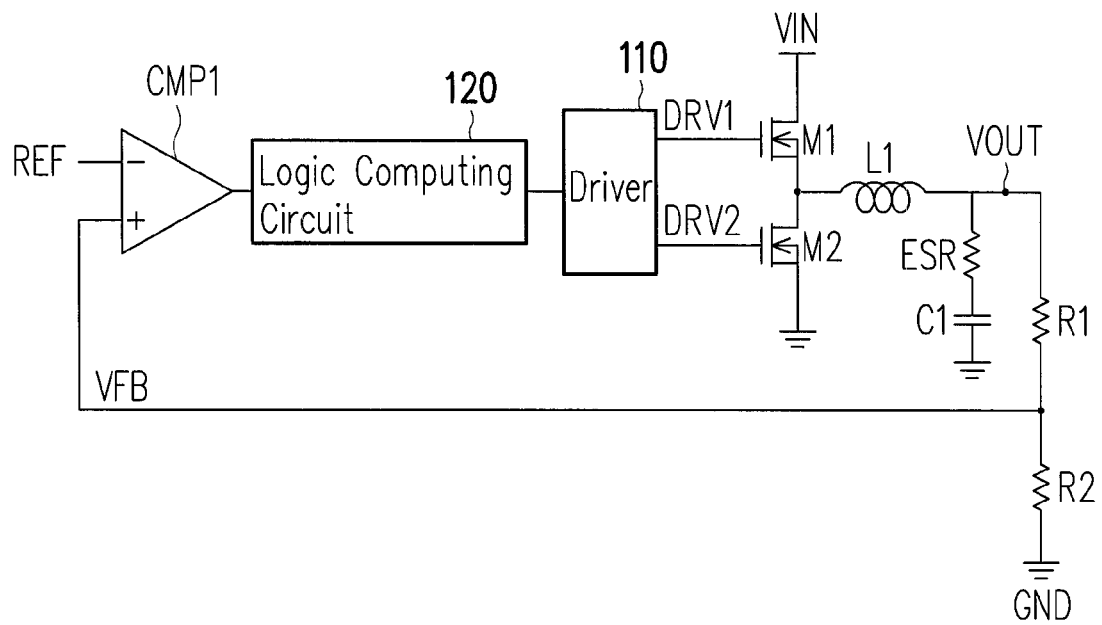
FIG. 1A illustrates a conventional voltage converter.
Figure 1B:
FIG. 1B is a waveform diagram of the conventional voltage converter of FIG. 1A.
Figure 1B:
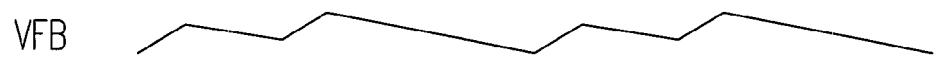
Figure 1B:
Figure 2:
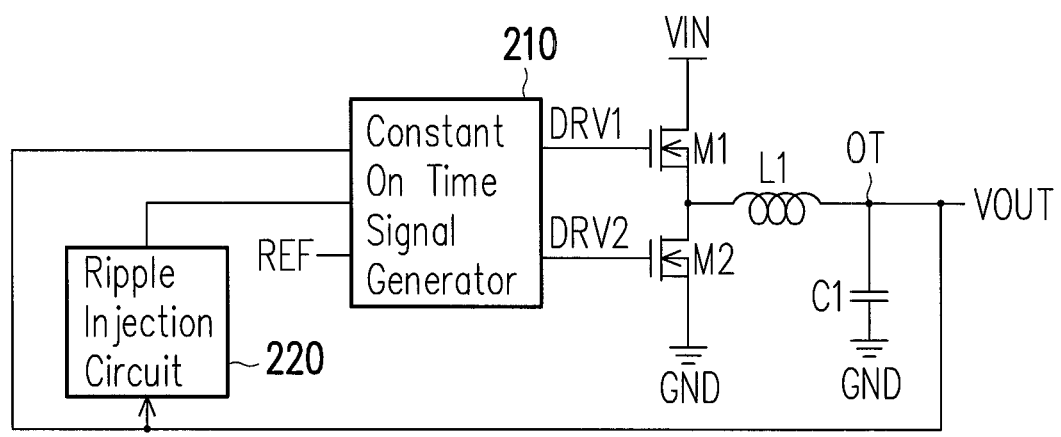
FIG. 2 illustrates a voltage converter according to one embodiment.

FIG. 2 illustrates a voltage converter 200 according to one embodiment. Referring to FIG. 2, the voltage converter 200 is a buck voltage converter and includes a constant on time signal generator 210, a ripple injection circuit 220, transistors M1 and M2, an inductor L1, and a capacitor C2. The constant on time signal generator 210 is used to generate a driving signal DRV1 and a driving signal DRV2. The transistor M1 includes a first terminal, a second terminal, and a control terminal. The first terminal of the transistor M1 receives a power supply voltage VIN, and the control terminal of the transistor M1 receives the driving signal DRV1 to turn on or turn off the transistor M1. The transistor M2 includes a first terminal, a second terminal, and a control terminal. The first terminal of the transistor M2 is coupled to the second terminal of the transistor M1, the control terminal of the transistor M2 receives the driving signal DRV2 to turn on or turn off the transistor M2, and the second terminal of the transistor M2 is coupled to a reference ground voltage GND. In addition, an output capacitor C2 is series-connected between an output terminal OT and the reference ground voltage GND. The output capacitor C2 may be a low effective series resistance (ESR) capacitor.

The inductor L1 is series-connected between the second terminal of the transistor M1 and the output terminal OT of the voltage converter 200, and an output signal VOUT is generated at the output terminal OT of the voltage converter 200. The ripple injection circuit 220 is coupled to the output signal VOUT to extract a ripple portion of the output signal VOUT. The constant on time signal generator 210 generates the driving signals DRV1 and DRV2 according to the ripple portion extracted by the ripple injection circuit 220, the output signal VOUT and a reference signal REF.

Specifically, in the present embodiment, the ripple injection circuit 220 captures the voltage of the output signal VOUT to generate a ripple injection signal into the constant on time signal generator 210. The constant on time signal generator 210 then generates the driving signals DRV1 and DRV2 according to all of the output signal VOUT, the reference signal REF, and the ripple injection signal. For example, the constant on time signal generator 210 may add the output signal VOUT and the ripple injection signal, compare the adding result with the reference signal REF, and then generate the driving signals DRV1 and DRV2 according to the comparison result. In an alternative embodiment, the constant on time signal generator 210 may also add the reference signal REF and the ripple injection signal generated according to the output signal VOUT, compare the adding result with the output signal VOUT, and generate the driving signals DRV1 and DRV2 according to the comparison result.

It is noted that because the driving signals DRV1 and DRV2 are generated according to the ripple portion of the output signal VOUT, when the output capacitor C2 is a low ESR capacitor, the ripple injection signal generated according to the output signal VOUT may also be strengthened to generate the driving signals DRV1 and DRV2. As such, the voltage converter 200 can generate an output signal VOUT with steady ripple.

Figure 3A:
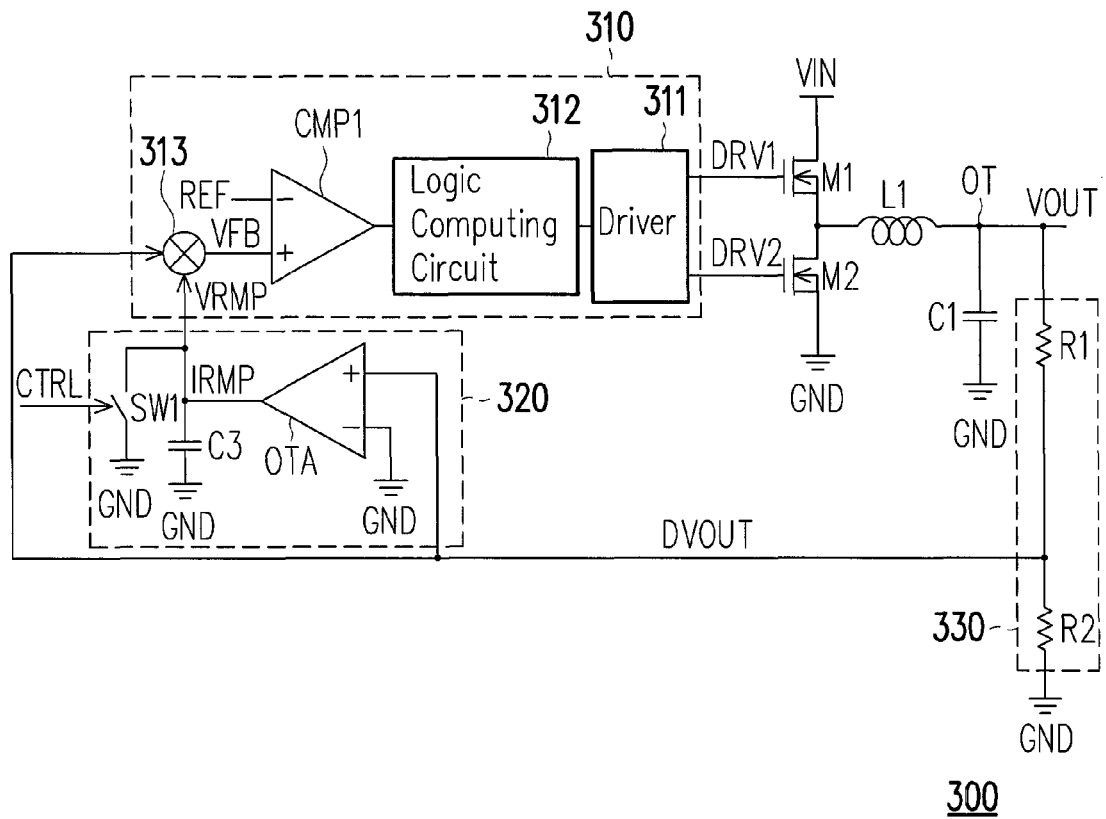
FIG. 3A illustrates a voltage converter according to another embodiment.

FIG. 3A illustrates a voltage converter 300 according to another embodiment of the present invention. Referring to FIG. 3A, the voltage converter 300 includes a constant on time signal generator 310, a ripple injection circuit 320, a voltage division circuit 330, transistors M1 and M2, an inductor L1, and a capacitor C1.

The ripple injection circuit 320 includes a transconductance amplifier OTA, a capacitor C3, and a reset switch SW1. One input terminal of the transconductance amplifier OTA receives a divided voltage DVOUT divided from the output signal VOUT, another input terminal of the transconductance amplifier OTA receives a reference ground voltage GND, and an output terminal of the transconductance amplifier generates a ramp current IRMP. That is, the transconductance amplifier OTA of the ripple injection circuit 320 extracts the ripple portion of the output signal VOUT, and transforms the extracted ripple portion into the ramp current IRMP. A capacitor C3 is coupled to the output terminal of the transconductance amplifier OTA to receive the ramp current IRMP so as to be charged and thereby generate a ramp voltage VRMP.

In addition, one terminal of the reset switch SW1 is coupled to the output terminal of the transconductance amplifier OTA, and another terminal of the reset switch SW1 is coupled to the reference ground voltage GND. The reset switch SW1 turns on or turns off in response to a control signal CTRL. When the reset switch SW1 turns on according to the control signal CTRL, charges on the capacitor C3 may be discharged through the reset switch SW1 that is turned on so that a voltage difference between two terminals of the capacitor C3 may keep being zero volt before receiving a next ramp current IRMP. The ripple portion of the output signal VOUT occurs periodically and, accordingly, the ramp current IRMP is also generated periodically. Also because of this, turn-on or turn-off of the reset switch SW1 takes place alternatively and periodically.

In the present embodiment, the constant on time signal generator 310 includes a driver 311, a logic computing circuit 312, an adder 313, and a comparator CMP1. The adder 313 receives the ramp voltage VRMP from the capacitor C3 and the divided voltage DVOUT to perform the adding operation, and generates a feedback voltage VFB according to the adding result. The comparator CMP1 compares the feedback voltage VFB with the reference signal REF, and transmits the comparison result to the logic computing circuit 312. The logic computing circuit 312 performs logic computation on the comparison result generated by the comparator CMP1, and transmits the logic computing result to the driver 311. The driver 311 is coupled to the logic computation circuit 312, and receives the computing result of the logic computation and generates the driving signals DRV1 and DRV2 according to the computing result.

Here, details of the logic computing circuit 312 and driver 311 are well known in the art and, therefore, are not discussed further herein.

In addition, the ripple injection circuit 320 of the present embodiment does not directly receive the output signal VOUT; instead, it extracts the ripple portion by receiving the divided voltage DVOUT that is divided from the output signal VOUT by the voltage division circuit 330. Here, the voltage division circuit 330 includes resistors R1 and R2. One terminal of the resistor R1 is coupled to the output terminal OT of the voltage converter 300, and another terminal of the resistor R1 is coupled to the ripple injection circuit 320. One terminal of the resistor R2 is coupled to the resistor R1 and the output terminal of the voltage converter 300, and another terminal of the resistor R2 is connected to a reference ground voltage GND.

Figure 3B:
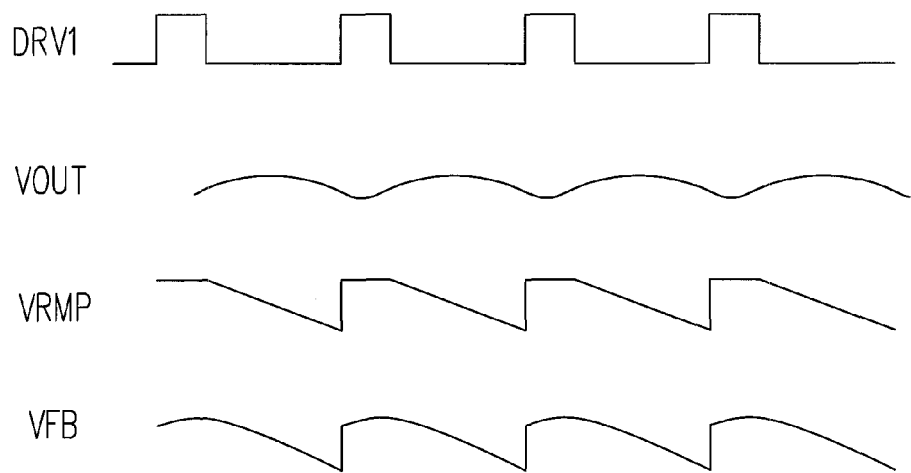
FIG. 3B is a waveform diagram of the voltage converter of FIG. 3A.

FIG. 3B is a waveform diagram of the voltage converter 300 according to one embodiment of the present invention. As can be clearly seen in FIG. 3B, the step down output voltage VOUT generated by the voltage converter 300 can have steady ripple.

Figure 4A:
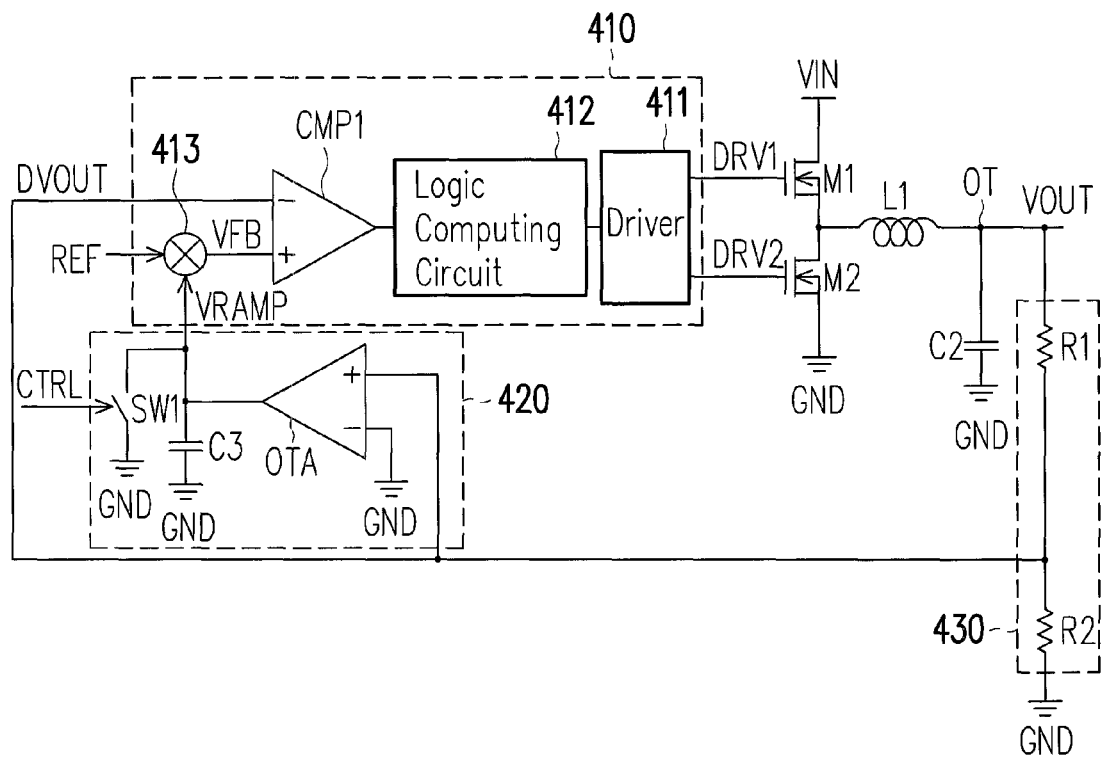
FIG. 4A illustrates a voltage converter according to another embodiment.

FIG. 3A illustrates a voltage converter 400 according to another embodiment of the present invention. Referring to FIG. 4A, the voltage converter 400 includes a constant on time signal generator 410, a ripple injection circuit 420, a voltage division circuit 430, transistors M1 and M2, an inductor L1, and a capacitor C1. Different from the embodiment of FIG. 3A, an adder 413 of the present embodiment adds the reference signal REF and the ramp voltage VRMP, and generates a feedback voltage VFB. The comparator CMP 1 then compares the feedback voltage VFB with the divided voltage DVOUT, and transmits the comparison result to the logic computing circuit 412, such that the logic computing circuit 412 can generate the driving signals DRV1 and DRV2 according to the comparison result.

Figure 4B:
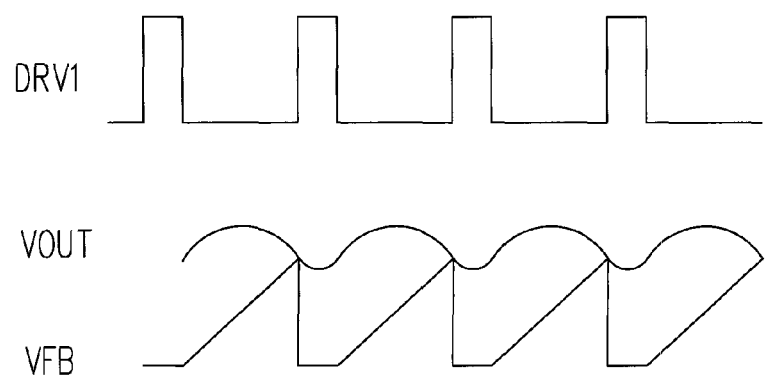
FIG. 4B is a waveform diagram of the voltage converter of FIG. 4A.

FIG. 4B is a waveform diagram of the voltage converter 400 according to one embodiment of the present invention. As can be clearly seen in FIG. 4B, the step down output voltage VOUT generated by the voltage converter 400 can likewise have steady ripple.

In summary, in embodiments of the present invention, the ripple portion of the output signal is extracted, and the constant on time signal generator generates the driving signals according to the ripple portion, output signal and preset reference signal to control switching operations of the transistors in the voltage converter. As such, the voltage converter can generate a step down output voltage with steady ripple.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A voltage converter comprising:
   a constant on time signal generator generating a first driving signal and a second driving signal;
   a first transistor having a first terminal, a second terminal, and a control terminal, the first terminal of the first transistor receiving a power supply voltage, the control terminal receiving the first driving signal;
   a second transistor having a first terminal, a second terminal, and a control terminal, the first terminal of the second transistor coupled to the second terminal of the first transistor, the control terminal of the second transistor receiving the second driving signal, the second terminal of the second transistor connected to a reference ground voltage;
   an inductor series-connected between the second terminal of the first transistor and an output terminal of the voltage converter, an output signal being generated at the output terminal of the voltage converter; and
   a ripple injection circuit coupled to the output signal and generating a ripple injection signal according to the output signal,
   wherein, the constant on time signal generator generates the first and second driving signals according to the ripple injection signal, the output signal, and a reference signal,
   wherein the ripple injection circuit generates a ramp current according to the output signal and generates a ramp voltage to be the ripple injection signal according to the ramp current.

2. The voltage converter according to claim 1, wherein the ripple injection circuit comprises:
   a transconductance amplifier has a first input terminal for receiving the output signal, another input terminal receives the reference ground voltage, and an output terminal generates the ramp current; and
   a capacitor having a first terminal coupled to the output terminal of the transconductance amplifier and the constant on time signal generator, and a second terminal coupled to the reference ground voltage, the capacitor receives the ramp current and generates the ramp voltage at the first terminal.

3. The voltage converter according to claim 2, wherein the ripple injection circuit further comprises:
   a reset switch coupled to the capacitor and is turned on or off in response to a control signal.

4. The voltage converter according to claim 1, wherein the constant on time signal generator adds the output signal and the ramp voltage to generate a feedback signal, and the constant on time signal generator compares the feedback signal with the reference signal to generate the first and second driving signals.

5. The voltage converter according to claim 4, wherein the constant on time signal generator comprises:
   an adder adds the output signal and the ramp voltage to generate the feedback signal; and
   a comparator receives the feedback signal and the reference signal, the comparator compares the feedback signal with the reference signal to generate a comparison result;
   wherein, the constant on time signal generator generates the first and second driving signals according to the comparison result.

6. The voltage converter according to claim 5, wherein the constant on time signal generator further comprises:
   a logic computing circuit coupled to an output terminal of the comparator, the logic computing circuit receives the comparison result, and performs a logic computation on the comparison result; and
   a driver coupled to the logic computing circuit to receive a computing result of the logic computation and generate the first and second driving signals according to the computing result.

7. The voltage converter according to claim 1, wherein the constant on time signal generator adds the output signal and the ramp current to generate a feedback signal, and the constant on time signal generator compares the feedback signal with the reference signal to generate the first and second driving signals.

8. The voltage converter according to claim 7, wherein the constant on time signal generator comprises:
   an adder adds the reference signal and the ramp voltage to generate the feedback signal; and
   a comparator receives the feedback signal and the output signal, the comparator compares the feedback signal with the output signal to generate a comparison result;
   wherein, the constant on time signal generator generates the first and second driving signals according to the comparison result.

9. The voltage converter according to claim 8, wherein the constant on time signal generator further comprises:
   a logic computing circuit coupled to an output terminal of the comparator and receives and performs a logic computation on the comparison result; and
   a driver coupled to the logic computing circuit to receive a computing result of the logic computation and generate the first and second driving signals according to the computing result.

10. The voltage converter according to claim 1, further comprising:
    an output capacitor having one terminal coupled to the output terminal of the voltage converter, and another terminal coupled to the reference ground voltage,
    wherein, the output terminal is a low effective series resistance capacitor.

11. The voltage converter according to claim 1, further comprising:
    a voltage division circuit coupled between the rippled injection circuit and the output signal.

12. The voltage converter according to claim 11, wherein the voltage division circuit comprises:
    a first resistor has one terminal coupled to the output terminal of the voltage converter, and another terminal coupled to the ripple injection circuit; and
    a second resistor has one terminal coupled to the first resistor and the output terminal of the voltage converter, and another terminal coupled to the reference ground voltage.

* * * * *